July 2, 1935.　　　B. J. ANDERSON　　　2,006,617

VELOCIPEDE FENDER

Filed Dec. 21, 1934

BERT J. ANDERSON
INVENTOR

BY Leon T. Hooper
ATTORNEY

Patented July 2, 1935

2,006,617

UNITED STATES PATENT OFFICE 2,006,617

VELOCIPEDE FENDER

Bert J. Anderson, Hammond, Ind.

Application December 21, 1934, Serial No. 758,624

10 Claims. (Cl. 208—141)

This invention relates to an improvement in velocipede fenders, and is a companion case to the application filed August 25, 1934, Serial Number 741,392, for a Velocipede, and has for one of its principal objects the provision of means for producing a fender of this type from two sheet metal stampings.

Another and further important object of the invention resides in the fact that the two pieces forming the fender are welded or otherwise secured to each other without leaving an unsightly outside seam.

Still another and further important object of the invention resides in the provision of means for attaching the fender to a step plate, or axle supporting member.

A still further important object of the fender of this invention resides in the means for securing a hub cap on the outer side of the fender itself.

An additional object of importance resides in the aligned drawneck apertures on each side of the fender for supporting an axle.

The invention shows other objects and features of advantage, some of which will be set forth in the following specification and attached drawing.

Figure 1:
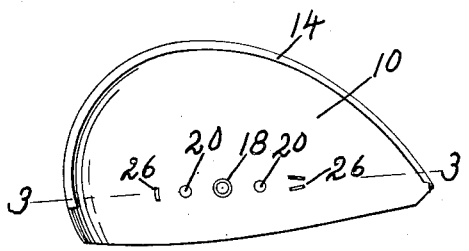
Figure 1 is an elevation of one section of the fender taken from the inside, and shows the relative positions of the various apertures.
Figure 2:
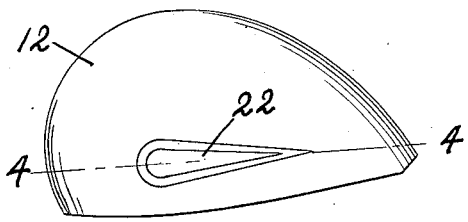
Figure 2 is a side elevation of the fender and shows the location thereon of the hub cap.
Figure 3:
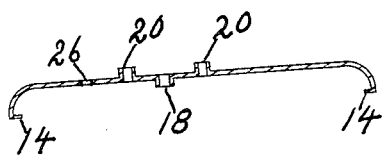
Figure 3 is a sectional view of one side of the fender taken on the line 3—3 of Figure 1.

The reference numeral 10 indicates in a general way a stamping which forms each side of the completed fender 12.

Figure 4:
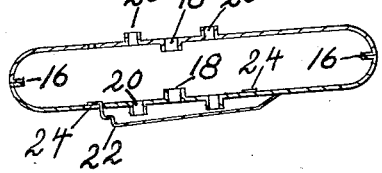
Figure 4 is a sectional view of the fender taken on the line 4—4 of Figure 2.
Figure 5:
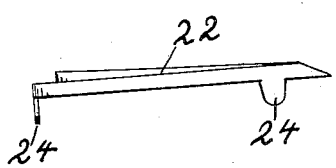
Figure 5 is a side elevation of the hub cap member and shows the location of the tongue securing members thereon.
Figure 6:
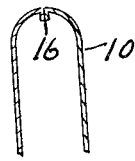
Figure 6 is a vertical sectional view of the fender of this invention, and shows the correspondingly downwardly turned edges of each section.
Figure 7:
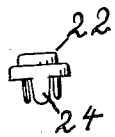
Figure 7 is a front elevation of the hub cap member.

The stampings 10 which go to make up the completed fender are identical with the exception that they are right and left handed, as is clearly shown in Figure 4.

Each stamping 10 has a substantially flat lower edge and side, and an inwardly rolled and downwardly turned upper edge 14.

In assembly, the upper edges 14 of a right and left hand stamping are placed together and spot welded, making a seam 16 which extends over the entire front and top of the fender. This construction produces a sturdy and rigid fender which is practically indestructible.

In the construction of a fender for use on the rear wheels of a velocipede, especially the velocipede set forth in the parent case above referred to, it has been found advisable to make provision for an axle to extend through both sides of the fender and also to provide means for securing the fender itself to a deck plate or an axle supporting member.

Therefore, this fender is provided with centrally located drawneck axle receiving apertures 18. The extending portion of each of these apertures is directed inwardly, as is best shown in Figure 4. This construction provides a wide contact point between fender and axle.

Located on each side of the aperture 18 is a drawneck aperture 20. The extending portion of the apertures 20 is directed outwardly to be inserted in correspondingly located apertures in a deck plate member. The protruding ends of the drawneck aperture 20 may be spread for securing the fender and deck plate member in association. It will be apparent from this construction that rivets or bolts may be dispensed with.

It will be apparent that the apertures 20 on the outer half of the fender would be unsightly and give an unfinished appearance to the assembled product, therefore, a hub cap 22, large enough to cover the aperture 20 and also the protruding end of an axle, is secured to the fender by the cooperation of the tongues 24 and the tongue receiving slots 26.

It will be apparent from the foregoing that herein is provided a fender formed of two pieces of sheet metal which are joined without leaving an unsightly seam, such as is produced by an overlapping joint.

Moreover, it will be apparent from the foregoing that herein is provided a fender which may be economically manufactured and which readily lends itself to various kinds of decorations and streamlining.

Furthermore, it is understood, that the shape of the fender shown in the drawing is but one form adapted for use on the rear wheels of velocipedes and that various other shapes may be formed and assembled in the manner above set forth for use on either front or rear wheels of toy vehicles.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A velocipede fender comprising a right hand and a left hand section each of substantially inverted L cross section, the upper edges of said sections being turned downwardly and joined together, axle supporting perforations in each of said sections, and closely adjacent thereto a plurality of outwardly extending members formed of a portion of the fender.

2. A velocipede fender comprising two substantially L shaped sections joined together, each section having a plurality of definitely spaced and aligned apertures, the edges of certain of said apertures being turned inwardly to form an axle supporting surface, the edges of certain of said apertures being turned outwardly to form hollow cylinders, and at least two of said cylinders being adapted to pass through openings in a velocipede frame, and be secured therein.

3. A velocipede fender comprising two stampings having inwardly curved upper portions terminating in downwardly turned edges and substantially flat lower edges, said stampings being joined along the downwardly turned edges and said lower edges being spaced apart, and tubular means formed of a portion of each stamping for securing said fender to a velocipede.

4. A velocipede fender comprising two stampings joined along the upper edges thereof, said joined portions extending downwardly and inwardly, and the sides and lower edges of said stampings being spaced apart, a plurality of tongue receiving apertures in each stamping and tubular means formed of a portion of the stamping itself for securing said fender to a velocipede.

5. A velocipede fender comprising two apertured stampings joined along the upper edges thereof, said joined portions extending downwardly and inwardly, the sides and lower edges of said stampings being spaced apart, a hub cap having tongues adapted to extend through certain of the apertures in said stamping, and an aligned drawneck axle receiving aperture in each side of said fender, the extending part of said apertures being directed inwardly.

6. A velocipede fender comprising two stampings joined along the upper edges thereof, said joined portions extending downwardly and inwardly, the sides and lower edges of said stampings being spaced apart, an aligned drawneck axle receiving aperture in each side of said fender, the extending part of said apertures being directed inwardly, and a plurality of outwardly extending securing members formed in each side of said fender.

7. A velocipede fender comprising two stampings joined along the upper edges thereof, said joined portions extending downwardly and inwardly, the sides and lower edges of said stampings being spaced apart, an aligned drawneck axle receiving aperture in each side of said fender, the extending part of said apertures being directed inwardly, and a plurality of outwardly extending securing members formed in each side of said fender, said securing members comprising drawneck apertures adapted to be expanded.

8. A velocipede fender comprising two stampings having inwardly curved upper portions terminating in downwardly turned edges and substantially flat lower edges, said stampings being joined along the downwardly turned edges and said lower edges being spaced apart, means for supporting an axle in said fender and tubular means for securing said fender to the frame of a velocipede.

9. A velocipede fender comprising two stampings having inwardly curved upper portions terminating in downwardly turned edges and substantially flat lower edges, said stampings being joined along the downwardly turned edges and said lower edges being spaced apart, means for supporting an axle within said fender and tubular means formed of portions of the fender itself for securing said fender to the frame of a velocipede.

10. A velocipede comprising two joined stampings, the sides and lower edge of said stampings being spaced apart, and a hub cap associated with said fender, said hub cap having a plurality of tongues adapted to be inserted through the fender and clinched on the inside thereof.

BERT J. ANDERSON.